(12) United States Patent
Olsen et al.

(10) Patent No.: US 7,297,425 B1
(45) Date of Patent: Nov. 20, 2007

(54) INTERCONNECT DEVICE, FUEL CELL AND FUEL CELL STACK

(75) Inventors: Christian Olsen, Ballerup (DK); Harald Usterud, Hørsholm (DK); Jens Ulrik Nielsen, Søborg (DK)

(73) Assignee: Topsoe Fuel Cell A/S, Lyngby (DK)

( * ) Notice: Subject to any disclaimer, the term of this patent is extended or adjusted under 35 U.S.C. 154(b) by 715 days.

(21) Appl. No.: 10/762,477

(22) Filed: Jan. 23, 2004

(30) Foreign Application Priority Data

Feb. 15, 2003 (DK) ............................ 2003 00232

(51) Int. Cl.
*H01M 8/00* (2006.01)
(52) U.S. Cl. ........................................... 429/12
(58) Field of Classification Search ................. None
See application file for complete search history.

(56) References Cited

U.S. PATENT DOCUMENTS

| | | | | |
|---|---|---|---|---|
| 5,234,776 A | * | 8/1993 | Koseki | 429/30 |
| 5,300,370 A | * | 4/1994 | Washington et al. | 429/34 |
| 5,641,586 A | | 6/1997 | Wilson | |
| 5,846,668 A | | 12/1998 | Watanabe | |
| 6,146,780 A | | 11/2000 | Cisar et al. | |
| 6,207,312 B1 | | 3/2001 | Barbir et al. | |
| 2001/0004501 A1 | | 6/2001 | Puhalski | |
| 2002/0086200 A1 | | 7/2002 | Margiott | |

FOREIGN PATENT DOCUMENTS

| | | |
|---|---|---|
| JP | 60-227361 | 11/1985 |
| JP | 07-029579 | 1/1995 |
| JP | 11-016591 | 1/1999 |
| WO | WO 94/11912 A | 5/1994 |
| WO | WO 02/13287 | 2/2002 |

OTHER PUBLICATIONS

Mahlon S. Wilson et al., "Alternative Flow-Field and Backing Concepts for Polymer Electrolyte Membrane Fuel Cells", *Electrochemical Society*, vol. 95, No. 2, 1995.

\* cited by examiner

*Primary Examiner*—Dah-Wei Yuan
*Assistant Examiner*—Karie O'Neill
(74) *Attorney, Agent, or Firm*—Dickstein Shapiro LLP

(57) ABSTRACT

The invention provides an interconnect device for a fuel cell comprising an electrolyte, an anode and a cathode, the interconnect device comprising a channel system having a plurality of channels, each channel being closed in one end and having either an inlet side or an outlet side at the open end of the channel, each channel having an inlet side placed in alternating order with a channel having an outlet side, the inlet side of each channel placed in consecutive order on one side of the interconnect, and the outlet sides of each channel placed in consecutive order on the opposite side of the interconnect relative to the inlet side, and a second layer of channels is located on the surface of the channel system.

The invention also provides a fuel cell and a fuel cell stack in which the interconnect device is used.

12 Claims, 6 Drawing Sheets

INTERCONNECT DEVICE, FUEL CELL AND FUEL CELL STACK

The invention concerns a high temperature fuel cell, in particular a Solid Oxide Fuel Cell (SOFC) or a Molten Carbonate Fuel Cell (MCFC), in which reforming of hydrocarbons takes place in the anode chamber or within the anode itself. In particular it concerns an interconnect device in a SOFC or MCFC fuel cell in which the mechanical tension within the fuel cell is reduced.

BACKGROUND OF THE INVENTION

A SOFC comprises an oxygen-ion conducting electrolyte, a cathode at which oxygen is reduced and an anode at which hydrogen is oxidised. The overall reaction in a SOFC is that hydrogen and oxygen electrochemically react to produce electricity, heat and water.

The anode also comprises a high catalytic activity for the steam reforming of hydrocarbons into hydrogen, carbon dioxide and carbon monoxide. Steam reforming can be described by the reaction of a fuel such as natural gas with steam and the reactions which take place can be represented by the following equations:

$$CH_4 + H_2O \rightarrow CO + 3H_2$$

$$CH_4 + CO_2 \rightarrow 2CO + 2H_2$$

$$CO + H_2O \rightarrow CO_2 + H_2$$

The fuel gas supplied to the fuel cell contains in most cases steam, thus enabling the steam reforming process to occur according to the above equations at the anode surface. The hydrogen produced then reacts in above electrochemical reaction. The steam reforming reaction is, however, very endothermic and a large heat input is therefore required.

A typical temperature distribution in a fuel cell stack with a hydrocarbon feedstock therefore shows a dramatic temperature drop near the inlet of the fuel cell due to the fast endothermic reforming reaction resulting in severe temperature gradients within the cell.

The SOFC is a ceramic composite of three different materials. Ceramic SOFCs have low mechanical strength and in particular low tensile strength. The tensile strength within a SOFC is closely connected to temperature gradients and it is therefore highly important to minimise the temperature gradients and thereby the tensile strength of the SOFC. When the tensile strength in the fuel cell exceeds a given threshold value the cell will crack and the fuel cell will malfunction.

It is to some extent possible to control the tensile strength to an acceptable level by using a hydrogen feedstock, but in the future it is foreseen that natural gas and other hydrocarbon feedstock will become dominant. This will increase the problem dramatically as the endothermic reforming of hydrocarbons will reduce the temperature of the fuel cell in the fuel-inlet area significantly, thereby increasing the temperature gradients and the tensile strength in the fuel cell to an unacceptable level.

Several methods of reducing the temperature gradients are known. Most of these methods involve changes in operation parameters of the fuel cell system such as enhanced airflow to the cathode. Such changes are often connected to increased operation cost of the fuel cell system.

SUMMARY OF THE INVENTION

The objective of the invention is to reduce the thermal gradients and the tensile strength of the fuel cell by using an interconnect device which divides the fuel into a number of micro fuel cells. This is achieved by distributing the fuel gas supply to the fuel cell over the cell's entire surface. In this way many small electrochemical cells are created on one fuel cell. Due to the shorter distance between the heat requiring reforming reaction and the heat producing electrochemical reaction, the tensile strength of the cell is reduced considerably.

According to the invention there is therefore provided an interconnect device for a fuel cell comprising an electrolyte, an anode and a cathode, the interconnect device comprising a channel system having a plurality of channels each channel being closed in one end and having either an inlet side or an outlet side at the open end of the channel each channel having an inlet side placed in alternating order with a channel having an outlet side, the inlet side of each channel placed in consecutive order on one side of the interconnect, and the outlet sides of each channel placed in consecutive order on the opposite side of the interconnect relative to the inlet side, and a second layer of channels is located on the surface of the channel system.

The invention also provides a fuel cell comprising an electrolyte, an anode, a cathode and an interconnect device.

Furthermore, the invention provides a fuel cell stack comprising at least two fuel cells.

DETAILED DESCRIPTION OF THE INVENTION

A reduction of the thermal gradients within the fuel cell is accomplished by ensuring a fuel gas distribution to the entire cell surface, thereby enabling the endothermic reforming reaction and the exothermic electrochemical reaction to take place uniformly over the cell surface. The pressure gradients ensure a uniform gas flow over the majority of the cell area.

The interconnect device of the invention is primarily for high temperature application at the fuel gas side, i.e. the anode side, of the fuel cell. The oxygen side of the interconnect, i.e. the cathode side, can have any geometry suitable for the transport of the oxygen. This can for instance be straight, parallel channels or any other type known in the art.

The exact path of the fuel flow can vary and several fuel paths are given. Different embodiments of the interconnect of the invention are described below, each embodiment depicting a different construction of the interconnect and thus a different fuel flow path.

The table below gives an overview of the numbering of the different parts of the interconnect shown in the figures:

| Number | Interconnect Section |
|---|---|
| 1 | supply hole |
| 2 | supply channel |
| 3 | interconnect surface |
| 4 | collection channel |
| 5 | exit hole |
| 6 | second layer of channels |
| 7 | distributing hole |
| 8 | collecting hole |

Figures 1, 1A:
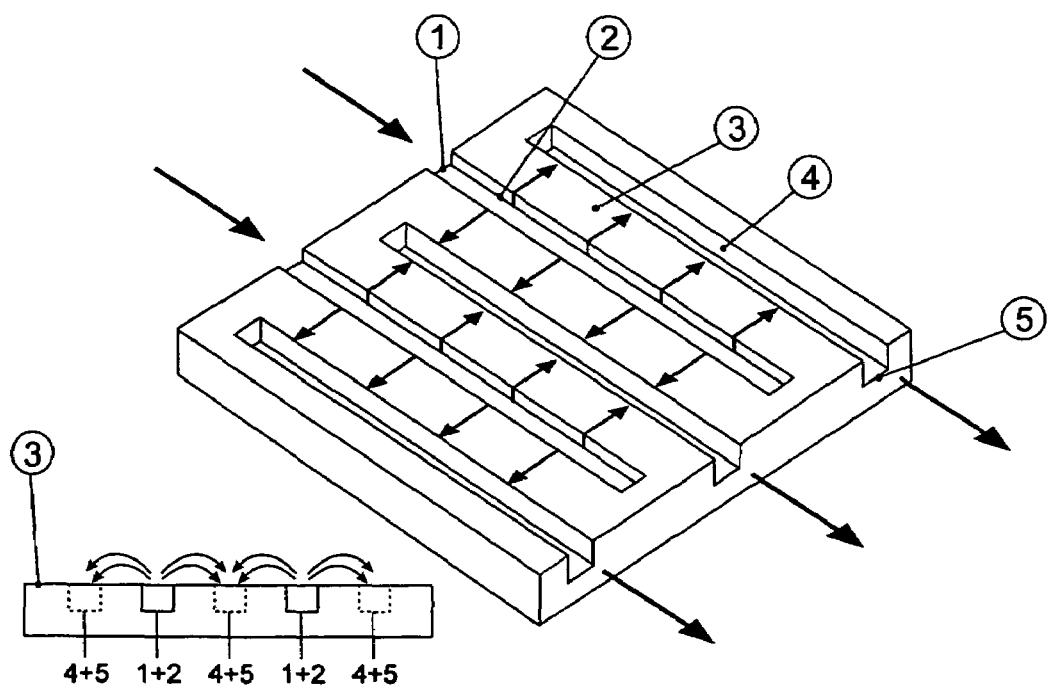
FIGS. 1 and 1a show an interconnect device with open gas supply and collection channels.

FIG. 1 shows a simple interconnect geometry, where the fuel flows from supply holes 1 and through the porous anode placed on the surface of the interconnect 3 on its way from the supply channel 2 to the collection channel 4. This embodiment has a channel system with an open gas supply and collection channels. By open channel is meant that the upper surface of the channel is not covered or closed throughout its length. By closed channel is meant that the upper surface of the channel is covered throughout its length.

The fuel gas path across the anode side is explained in more detail as follows:

Fuel enters the interconnect from one or more fuel supply holes 1. Fuel is distributed across the anode by supply channels 2 in the interconnect. The fuel is exposed to the anode material. If the fuel is a hydrocarbon, it reforms with steam in an endothermic reaction upon contact with the anode material. The fuel is then spent electrochemically in an exothermic reaction to produce electricity. These two reactions occur close to each other, and will benefit from each other as the reforming reaction can draw on the heat produced by the electrochemical reaction. The spent fuel exhaust is collected by channels 4 in the interconnect and led to exit holes 5 at the cell perimeter.

FIG. 1a shows a side view of the path followed by the fuel gas through the interconnect and the anode. The anode is placed on the surface of the interconnect 3 and the gas transport occurs from the supply channel 2 through the anode to the collection channel 4.

In the embodiment shown in FIG. 1 the supply and collection channels are straight, parallel channels. The channels are not limited to being straight and parallel, but can have another geometry for instance diagonally placed.

Figures 2, 2A:
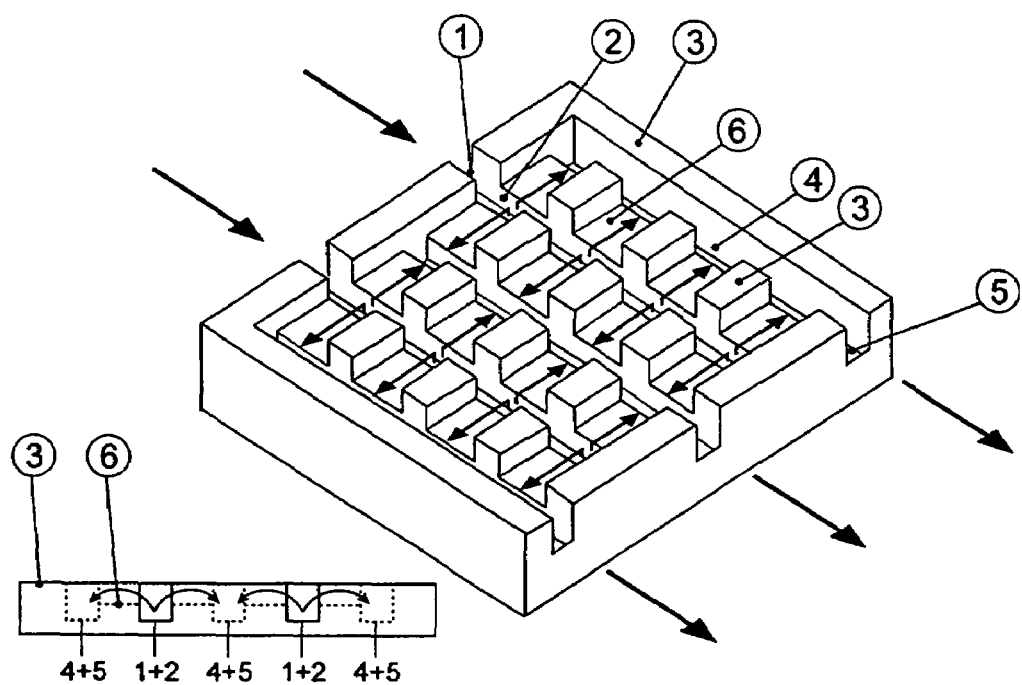
FIGS. 2 and 2a show an interconnect device with open gas supply and collection channels with surface channels at right angles.

In a second embodiment the flow of the fuel is not limited to occur entirely through the porous anode material. It can also flow partly through gaps created between the anode surface and the interconnect surface. This reduces the pressure drop. Such gaps are obtained by making a second layer of channels 6 in the interconnect surface 3, which are at an angle to the supply and collection channels 2 and 4, i.e. they intersect the channels of the channel system, and located on the surface of the channel system shown in FIG. 1. This is shown in FIG. 2, where the interconnect has open supply and collection channels with surface channels 6 created perpendicular to the supply and collection channels. Other angles can be chosen such that the second layer of surface channels 6 are not at right angles to the supply and collection channels 2 and 4. The second layer of surface channels 6, which are closed at both ends, can for instance be diagonally placed relative to the supply and collection channels 2 and 4.

FIG. 2a shows a side view of the path followed by the fuel gas. Gas transport occurs from the supply channels through the second layer of channels 6 to the collection channels. During its journey the gas contacts the anode placed on the interconnect surface 3 and is steam reformed.

Figures 3, 3A:
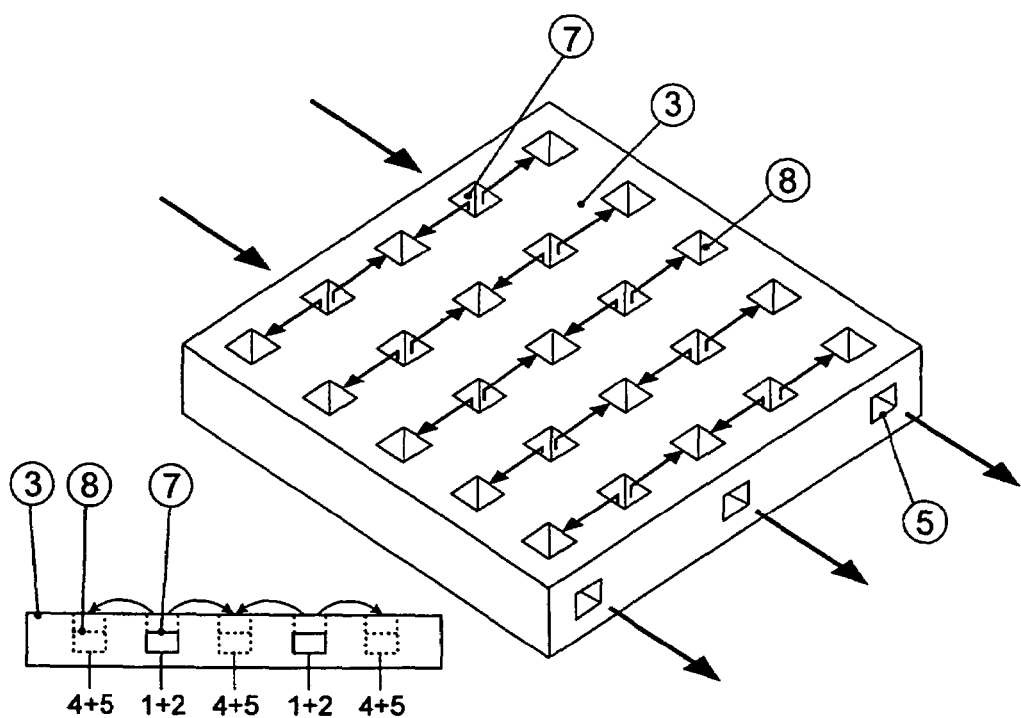
FIGS. 3 and 3a show an interconnect device with closed gas supply and collection channels and perforations in the interconnect surface.

In a third embodiment the supply channels are closed and the closed interconnect surface 3 is perforated in the area of the channels. In this embodiment the closed, perforated surface 3 corresponds to the second layer of channels being closed at their surface and at both ends, and perforated in the area of the channels. The channels of the second layer are placed parallel to and directly above those of the channel system. This ensures that fuel passing through a perforation will be reformed only in the vicinity of the perforation. FIG. 3 shows an interconnect with closed gas supply and collection channels, where the fuel flows through perforations made in the interconnect surface 3 above the supply channels and into the porous anode material. The reformed gas leaves the anode and enters the collection channel through the perforations placed above the collection channels 4.

FIG. 3a shows the presence of small fuel distribution holes 7 in the supply channel 2 and fuel exhaust collecting holes 8 in the collection channel 4.

Figures 4, 4A:
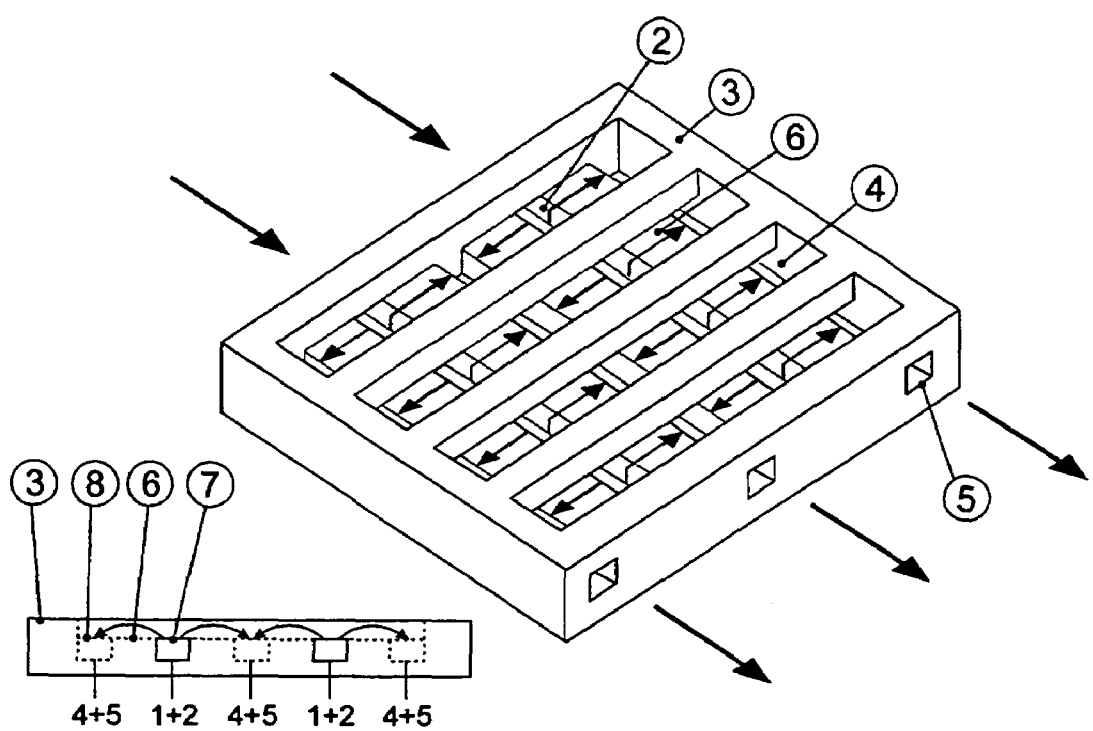
FIGS. 4 and 4a show an interconnect device with partly closed gas supply and collection channels with surface channels at right angles.

In a fourth embodiment the flow is partly through a second layer of channels 6 in the interconnect surface 3 at an angle to the supply and collection channels 2 and 4. This reduces the pressure drop. This is shown in FIG. 4 where the second layer of channels 6 are perpendicular to the supply and collection channels 2 and 4 of the channel system. The channels 2 and 4 are partly closed. The second layer of channels 6 can also be at another angle to channels 2 and 4, for instance diagonal. They are closed at both ends.

FIG. 4a shows a side view of the path followed by the fuel gas indicating the presence of fuel distributing holes 7 in the supply channel 2 and exhaust collecting holes 8 in the collection channel 4.

In the various embodiments, it can be practical to construct the anode side of the interconnect from two or more interlayers instead of a single layer. This can for instance be done by constructing an interlayer provided with the channel system, and placing a second interlayer provided with a second layer of channels on the surface of the first interlayer.

Figure 5:
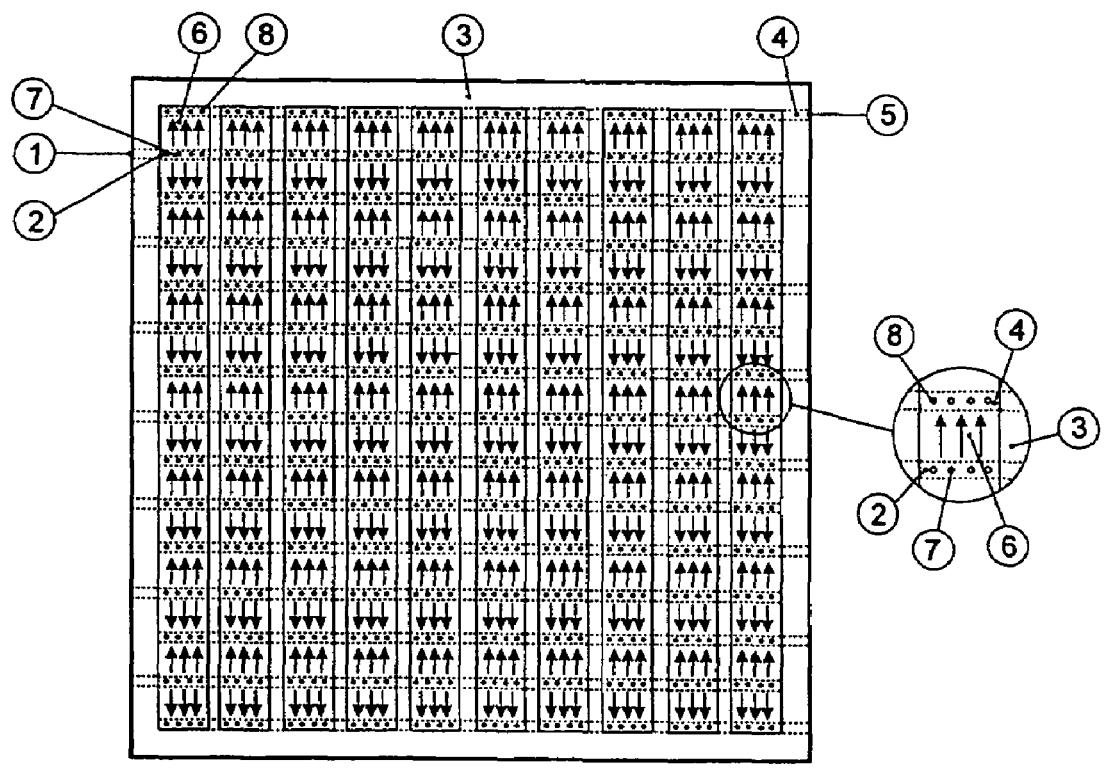
FIG. 5 shows a top view of an interconnect device.

FIG. 5 shows a top view of the anode side of an interconnect. This view illustrates the embodiment described in FIG. 4, where the interconnect has partly closed gas supply and collection channels. It illustrates the formation of many small electrochemical cells created on one fuel cell.

A fuel cell is placed on the upper surface of the interconnect 3 with the anode side towards the interconnect. The fuel cell should be sealed firmly along the edges of the interconnect to prevent the overall fuel gas flow from following any other path than the prescribed path.

The hydrocarbon containing fuel gas is supplied to the interconnect through a number of supply holes 1 connected to a closed fuel gas supply channel 2. A number of small fuel supply distribution holes 7 in the supply channel 2 allow the fuel to flow out from the supply channels 2, thus exposing it to the anode side of the fuel cell lying on top of the interconnect. The fuel will flow from the distribution holes 7 across the surface of the second layer of channels 6 to the fuel exhaust collection holes 8, which connect the gas to the closed fuel exhaust collection channels 4. During its journey the gas contacts the anode and is steam reformed. From the collection channels 4 the reformed fuel gas exits the interconnect through the fuel exhaust exit holes 5. The reformed fuel gas includes hydrogen, which reacts in an overall electrochemical reaction with oxygen to produce electricity, heat and water. The exhaust products exiting the anode side of the interconnect are therefore primarily carbon dioxide and water. The fuel gas flow is controlled by the pressure difference between the fuel gas supply and the fuel gas exhaust.

The interconnect of the invention can have distribution holes 7 and collecting holes 8 placed in the supply and collection channels 2 and 4 when required. This ensures that a supply of fresh fuel gas, before exposure to the anode, is distributed out all over the surface of the fuel cell. By employing the interconnect in a fuel cell, in cases where the fuel gas contains hydrocarbons, the endothermic reforming reactions are distributed uniformly over the surface of the fuel cell. The simultaneously occurring electrochemical reaction is distributed uniformly over the surface of the fuel cell allowing the waste heat from this reaction to be used for the reforming reaction. The temperature differences between the fuel supply distribution holes 7 and the fuel exhaust collecting holes 8, which arise due to variations between the waste heat production from the electrochemical reaction and heat consumption from the reforming, are minimised due to the short distances for the heat transport. The heat transport will mainly be through heat conduction in the interconnect and in the fuel cell.

As a result of the minimised temperature gradients it is furthermore obtained that the mechanical stress in the fuel cell due to temperature gradients are minimised, thereby decreasing the probability for a mechanical failure of the fuel cell. The gradients will be minimised for any type of fuel gas applied, but the advantage will typically be highest in cases in which a hydrocarbon feedstock is reformed in contact with the anode.

Figure 6:
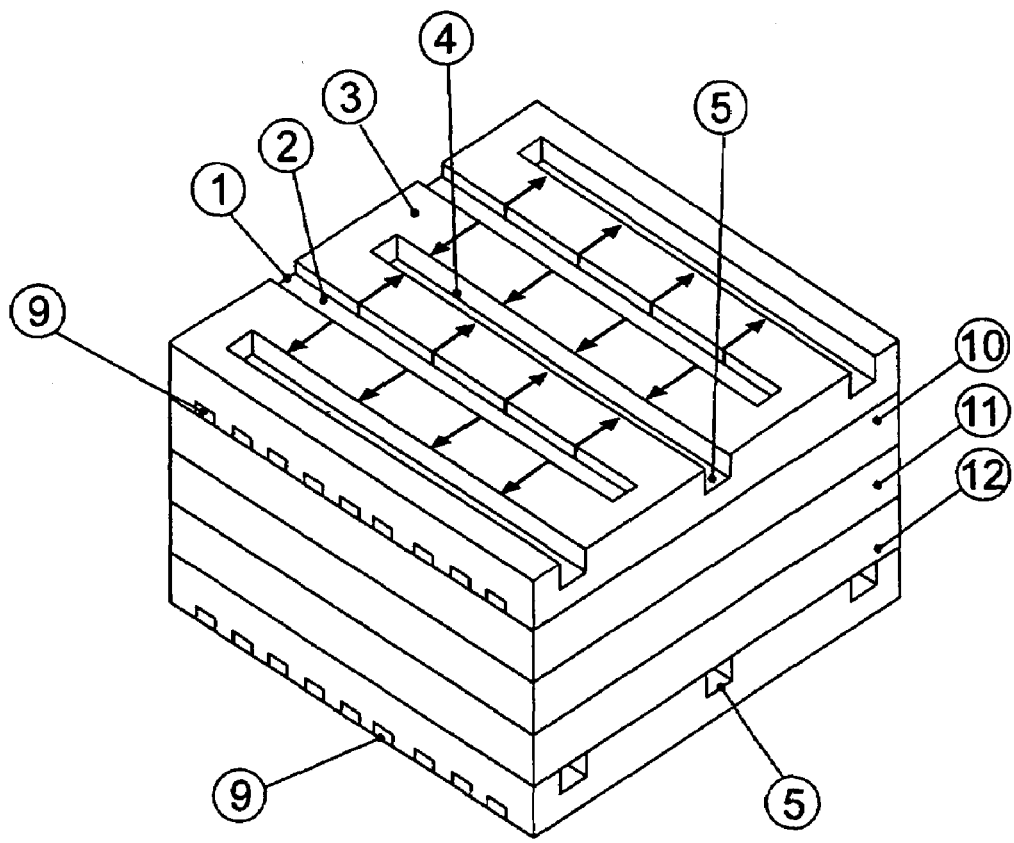
FIG. 6 shows a section of an assembled fuel cell stack.

FIG. 6 illustrates a section of an assembled fuel cell stack showing the position of the interconnect relative to the other components of the fuel cell. Five layers are shown—the top layer shows the interconnect placed on the cathode 10. The oxygen supply channels 9 provide oxygen for reaction at the cathode, and they are located on the cathode side of the interconnect. The geometry of the oxygen supply channels 9 are chosen to facilitate the transfer of the required amounts of oxygen to the cathode. They can for instance be formed as straight, parallel channels. Other geometries known in the art are applicable.

The cathode 10 is placed between the interconnect and the electrolyte layer 11. This is followed by the anode layer 12, which has its other surface in contact with the interconnect surface 3.

The two contact surfaces of the interconnect can be provided for in different ways, for example by contacting two interlayers with each other, one interlayer having an anode side with a fuel gas supply system as described in the various embodiments of the invention, the other interlayer having a cathode side with an oxygen supply system that is conventionally applied in the art. The two interlayers together provide the interconnect in this case.

The interconnect of the invention can be applied in fuel cells utilising either internal or external manifolds.

The invention claimed is:

1. An interconnect device for a fuel cell comprising an electrolyte, an anode and a cathode, the interconnect device comprising a channel system having a first plurality of channels, each channel being closed in one end and having either an inlet side or an outlet side at the open end of the channel, each channel having an inlet side placed in alternating order with a channel having an outlet side, the inlet side of each channel being placed in consecutive order on one side of the interconnect, and the outlet side of each channel being placed in consecutive order on the opposite side of the interconnect relative to the inlet side, and a second plurality of channels located on the surface of the first plurality of channels of the channel system so that the second plurality of channels is in a separate plane which is parallel to the first plurality of channels.

2. The interconnect device according to claim 1, wherein the first plurality of channels of the channel system has a plurality of straight, parallel channels.

3. The interconnect device according to claim 1,
wherein channels of the second plurality of channels intersect the channels in the first plurality of channels of the channel system, the second plurality of channels being closed at both ends and the channels of the first plurality of channels remaining open throughout their length.

4. The interconnect device according to claim 1,
wherein the channels of the second plurality of channels are closed at their surface and at both ends, and are placed parallel to and directly above the channels of the first plurality of channels, the closed surface being perforated in the area of the channels.

5. The interconnect device according to claim 4, wherein the closed, perforated surface of the channel system comprises a separate interlayer placed on the surface of the channel system.

6. The interconnect device according to claim 1, wherein the second plurality of channels intersects the channels of the first plurality of channels, the second plurality of channels being closed at both ends, the first plurality of channels being partly closed.

7. The interconnect device according to claim 3,
wherein the second plurality of channels comprises a separate interlayer placed on the surface of the channel system.

8. The interconnect device according to claim 1, wherein the channels of the first plurality of the channel system are provided with distribution and collection holes.

9. A fuel cell comprising an electrolyte, an anode, a cathode and an interconnect device according to claim 1.

10. The fuel cell according to claim 9, wherein the fuel cell is a solid oxide fuel cell.

11. The fuel cell according to claim 9, wherein the fuel cell is a molten carbonate fuel cell.

12. A fuel cell stack comprising at least two fuel cells according to claim 9.

* * * * *